United States Patent [19]

Borchardt et al.

[11] 4,447,342

[45] May 8, 1984

[54] METHOD OF CLAY STABILIZATION IN ENHANCED OIL RECOVERY

[75] Inventors: John K. Borchardt; David L. Brown, both of Duncan, Okla.

[73] Assignee: Halliburton Co., Duncan, Okla.

[21] Appl. No.: 369,764

[22] Filed: Apr. 19, 1982

[51] Int. Cl.³ .................... E21B 43/22; E21B 43/12; E21B 43/25

[52] U.S. Cl. ............................. 252/8.55 D; 166/273; 166/274; 166/275; 166/305 R; 252/8.55 R

[58] Field of Search ................. 166/273, 305 R, 274, 166/275; 252/8.55 D, 8.55 R

[56] References Cited

U.S. PATENT DOCUMENTS 3,710,863 1/1973 Webster et al. ............... 166/305 R
4,366,071 12/1982 McLaughlin et al. ......... 252/8.55 D

*Primary Examiner*—Christine M. Nucker

*Attorney, Agent, or Firm*—Thomas R. Weaver; G. Keith deBrucky

[57] ABSTRACT

A method of preventing permeability damage due to clay swelling, disintegration and migration in subterranean formations producing oil and gas, where such formations are to be the subject of enhanced oil recovery techniques using anionic or caustic flood chemicals. Prior to the use of such enhanced oil recovery techniques, a cationic organic polymer capable of stabilizing clays is introduced into an oil reservoir treatment area followed by introduction of a sufficient amount of a non-anionic aqueous spacer fluid to cause the cationic organic polymer to reorient itself on the reservoir clays in a substantially monomolecular layer and manner such that it will continue to stabilize the reservoir clays but will not substantially react with the anionic or caustic flood chemicals to form permeability damaging precipitates or to decompose thereby reducing its clay stabilization effectiveness.

26 Claims, No Drawings

METHOD OF CLAY STABILIZATION IN ENHANCED OIL RECOVERY

BACKGROUND OF THE INVENTION

1. Field of the Invention

The present invention relates to a method of clay stabilization in oil reservoirs that are subject to anionic or caustic chemical flooding via enhanced oil recovery techniques, and particularly, to the introduction of a cationic organic polymer having clay stabilization properties into an oil reservoir treatment area followed by introduction of a non-anionic aqueous spacer fluid in an amount sufficient to reorient the polymer in a monomolecular layer prior to injection of the anionic or caustic chemical flood.

2. Description of the Prior Art

Cationic organic polymers have become widely used in preventing permeability damage due to clay swelling and disintegration in subterranean formations during oil and gas production. However, these cationic organic polymers form precipitates when they contact anionic chemicals such as petroleum sulfonates, partially hydrolyzed polyacrylamides, and certain microbial polysaccharides used in enhanced oil recovery. In the past, the solution to this problem has been either the use of a mutual solvent system or employment of nonionic surfactants and unhydrolyzed polyacrylamides or nonionic polysaccharides. This results in higher costs and/or reduced oil recovery.

A similar problem is encountered when caustic flooding is used as an enhanced oil recovery process. The oil reservoirs considered as caustic flood candidates are normally shallow and have quite high clay contents. The injected fluids: a conditioning fluid to reduce the salinity of formation water, especially the concentration of divalent metal cations, and a high pH solution (usually a sodium hydroxide, sodium silicate, or sodium carbonate solution) are of low salinity and can easily cause clay swelling and migration of fine particles leading to reduced formation permeability. The cationic organic polymer clay stabilizers that have been developed and are widely used to help control clay swelling and fine particle migration undergo a bimolecular elimination or other decomposition reactions in the high pH environment caused by caustic flooding. This bimolecular elimination reaction converts cationic nitrogen atoms to amines (see Equation 1 below) and can also substantially reduce the molecular weight of the clay stabilizer when the cationic atom is part of the polymer backbone (see Equation 2 below).

SUMMARY OF THE INVENTION

The embodiments of the invention disclosed herein are of a method of clay stabilization in enhanced oil recovery. This invention relates to the discovery that when a cationic organic polymer is deposited on a clay surface and a sufficient volume of inert spacer fluid passed over the clay surface, the cationic organic polymer will reorient itself on the clay surface in such a manner that it continues to stabilize the clays but does not substantially interact with anionic chemicals such as partially hydrolyzed polyacrylamides or petroleum sulfonates to form precipitates, and will prevent the destructive interaction of clay stabilizer and the base fluids used in caustic flooding.

It may be theorized that the inert spacer fluid serves to distribute the cationic organic polymer over the clays to form a tightly adsorbed monomolecular layer. The interaction of the clay stabilizer's cationic atoms with the clay is so strong and the cationic organic polymer is held so closely to the clay that interaction with anionic chemicals or the base ions in caustic flooding is too weak for precipitates to form or for the bimolecular elimination or other decomposition reactions to occur.

An adequate volume of inert spacer fluid is defined as the volume of inert spacer fluid sufficient to prevent the chemical reactions described above from occurring. The volume is dependent on the permeability and porosity of the particular rock formation involved as well as that formation's clay content. Laboratory tests have indicated that inert spacer fluid volumes in the range of 20–200 pore volumes have been found to be adequate. If an adequate amount of inert spacer volume is used, the flow rate of fresh water injected after the high pH solution will be observed to be about 80% or more of the initial brine flow rate before clay stabilization treatment.

So that the above-recited features, advantages and objects of the invention, as well as others which will become apparent, are attained and can be understood in detail, a more particular description of the invention is set forth below with respect to typical embodiments thereof, but the described embodiments should not be considered limiting of its scope, where the invention may admit to other equally effective embodiments which will be apparent from the description to one of ordinary skill in the art.

DESCRIPTION OF THE PREFERRED EMBODIMENTS

During primary petroleum recovery operations, the energy required to force oil into producing wells is supplied by the natural pressure drive existing in the formation or by mechanically lifting oil from the formation through the well bores of producing wells to the surface. At the end such primary petroleum recovery operations, a substantial quantity of oil remains in the formation. In enhanced oil recovery operations, energy for producing oil remaining in the subterranean oil-containing formation is supplied by injecting liquids or gases into the formation under pressure through one or more injection wells penetrating the formation. The liquids or gases drive the oil to producing wells penetrating the formation. Three common methods of artificially maintaining formation pressure and increasing oil recovery are caustic flooding, polymer flooding and micellar polymer flooding.

Caustic flooding is an enhanced oil recovery process often effectively used in formations containing crude oil having significant concentrations of organic acids. Such a high pH injected solution reacts with the organic acids in the crude oil to produce an emulsion which is considered to entrain or entrap the oil for movement as well as reduce the interfacial tension between the injected high pH solution and the crude oil. Chemicals used to produce the high pH in the injection fluid include sodium hydroxide, sodium carbonate, and sodium silicate, including especially sodium ortho-silicate. Other bases such as potassium hydroxide, potassium carbonate, and potassium silicate could also be used.

Another type of enhanced oil recovery technique is polymer flooding. Here a high molecular weight polymer is used to thicken the injection water. The thickened water more efficiently pushes the crude oil to a producing well and also aids in increasing the volume of the reservoir contacted by the injected fluid. This results in greater oil production. The most commonly used enhanced oil recovery polymers are anionic chemicals such as partially hydrolyzed polyacrylamides and certain microbial polysaccharides, especially xanthan gum.

Another enhanced oil recovery technique is the use of micellar polymer flooding. Micellar polymer flooding introduces a surfactant to reduce the interfacial tension between the oil prior to injecting flood water. Such reduction of the interfacial tension will cause the oil to be more readily displaced thereby increasing production. The most commonly used surfactants are anionic chemicals such as petroleum sulfonates or sulfonates of various hydrocarbon refinery streams. Again, anionic polymers such as partially hydrolyzed polyacrylamides and certain microbial polysaccharides can also be used to thicken the water injected after the surfactant solution. This prevents the injection water from fingering through the surfactant solution, contacting the crude oil, and increasing the interfacial tension thereby reducing oil recovery.

Unfortunately, use of caustic flood techniques and polymer or micellar polymer flood techniques is conducted in a low salinity environment that adversely affects reservoir conditions by more readily causing clay swelling and migration of fine particles leading to reduced formation permeability. Although cationic organic polymers have been successfully used for preventing permeability damage due to clay swelling and disintegration in subterranean formations during oil and gas production, such polymers have been ineffective when used in conjunction with these enhanced oil recovery processes. In the case of polymer or micellar polymer flooding, the cationic organic polymers form precipitates when they contact anionic chemicals. In the case of caustic flooding, the high pH solution thereof causes the cationic organic polymers to undergo a bimolecular elimination reaction which converts cationic nitrogen atoms to amines, exemplified as follows:

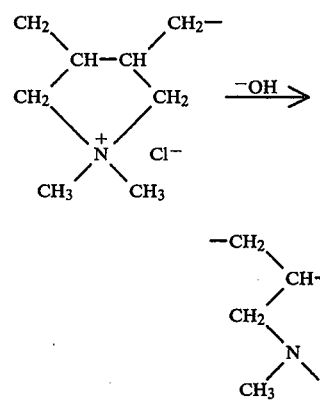

Equation 1.

Further, the molecular weight of the clay stabilizer can also be substantially reduced when the cationic atom is part of the polymer backbone, as exemplified in the following equation:

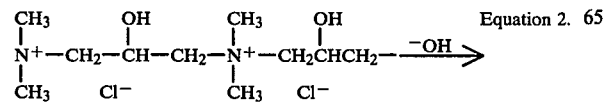

Equation 2.

-continued

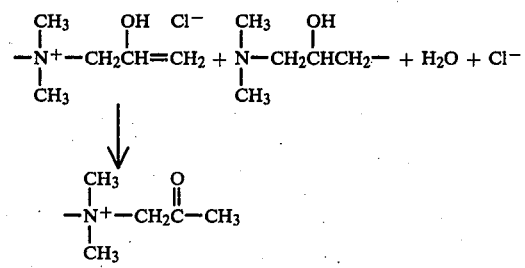

It should be noted in Equations 1 and 2 that such reactions also consume the caustic chemical injected into the formation.

Although it would appear that the above described chemistry would preclude the use of cationic organic polymers in caustic or polymer flooding, Applicants have discovered that the use of an adequate volume of an inert spacer fluid injected after treatment of the formation with the clay stabilizing cationic organic polymer and prior to the injection of the flood chemicals will prevent the formation of precipitates in the case of polymer or micellar polymer flooding or the destructive interaction of the clay stabilizer with the base in the case of caustic flooding.

By inert, it is meant that the fluid does not chemically react with the clay stabilizer. It is preferred that the inert spacer fluid be neutral or slightly saline. When slightly saline, it is preferred that the inert spacer fluid contain no more than about 5% salts by weight. Additionally, the presence of calcium or magnesium salt, or other salts containing multivalent metal ions, should be avoided, due to their chemical interference with the flood chemicals. In the case of polymer or micellar polymer flooding, it is imperative that the spacer fluid does not contain anionic surfactants or polymers containing anionic groups.

In accordance with the present invention, the following classes of cationic organic polymers have been found to be effective in the process described herein:

1. Cationic atoms in polymer chains such as:

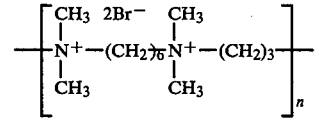

2. Cationic atoms in polymer chains containing heteroatoms such as oxygen, an example of which is the following:

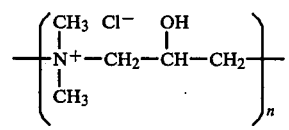

3. Cationic atoms in a ring, such as:

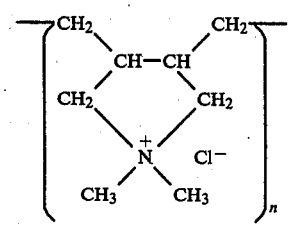

4. Cationic atoms in polymer side chains exemplified by the following formula:

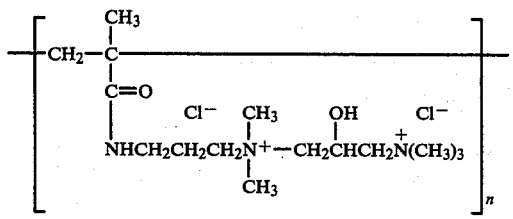

It is preferred that the cationic organic polymers of the present invention be diluted in a saline carrier solution. Such dilution is desirable to reduce the viscosity of the polymer solution, to prevent a multiple layering effect whereby multiple layers of clay stabilizer are adsorbed onto the clay requiring the use of greater amounts of inert spacer fluid to produce the desired monomolecular layer, and for economic reasons due to the high cost of the cationic organic polymer. Such a preferred solution contains greater than about 2% potassium chloride by weight, about 2% by weight ammonium chloride, or about 5% by weight sodium chloride. The concentration of the active polymer in such saline solutions should be between 0.1% and 10% by weight of active polymer. It is preferred that the concentration of active polymer in such saline solutions be between 0.25 and 1.0% by weight. The use of low salinity aqueous fluids as spacers and as the solvent for the clay stabilizer is preferred because the anionic flood chemicals function best in low salinity environments. It is preferred that the salinity of the solvent be kept as low as possible, but still above the lower limit described above for each specific salt. The salinity level of the spacer has no lower limit and is preferably maintained as low as possible.

An example of the present invention is illustrated by the result observed when a column containing 5% smectite, a water-swelling clay, was treated with approximately 9.8 pore volumes of a 3110 ppm solution of poly(diallyldimethylammonium chloride) (hereinafter referred to as "DADMAC polymer") followed by injection of approximately 19.6 pore volumes of aqueous 2% potassium chloride solution. Thereafter, approximately 9.8 pore volumes of a 750 ppm solution of a 33% hydrolyzed polyacrylamide was injected. The subsequent flow rate of aqueous 2% potassium chloride was only 22% of that of a column treated identically except that the cationic organic polymer was omitted from the 9.8 pore volume initial treatment solution. However, when the amount of 2% aqueous potassium chloride solution injected after the cationic organic polymer solution was increased to approximately 117.6 pore volumes, and the 33% hydrolyzed polyacrylamide solution then injected, the subsequent flow rate of aqueous 2% potassium chloride solution was greater than 100% of that of an identical column in which the cationic organic polymer was omitted from the treatment solution. When fresh water was injected into these columns, the column treated with the cationic organic polymer continued to exhibit a good flow rate while the other column, from which the cationic organic polymer had been omitted rapidly plugged. A 1% solution of a petroleum sulfonate (approximately 9.8 pore volumes) was injected onto the column treated with the cationic organic polymer clay stabilizer and was followed by an injection of fresh water. The fresh water flow rate was approximately 100% of the fresh water flow rate prior to the petroleum sulfonate injection.

These results indicate that when a sufficient volume of inert spacer fluid was injected (117.6 pore volumes was sufficient, while 19.6 pore volumes was not) the cationic organic polymer clay stabilizer did not interact with an anionic polymer or an anionic surfactant to form precipitates which reduce column permeability. The results when fresh water was injected demonstrate that the spacer fluid did not wash the cationic organic polymer out of the test column. These results occurred despite the fact that when this flood polymer or this surfactant is mixed with the cationic organic polymer in a beaker, a precipitate forms immediately.

Thus, it may be theorized that the spacer fluid serves to distribute the cationic organic polymer over the clays to form a tightly adsorbed monomolecular layer causing interaction of the organic cationic atoms of such clay stabilization polymer with the clay. This interaction is so strong and the cationic organic polymer held so closely to the clay that interaction with the anionic chemicals of the surfactant or flood polymer is too weak for substantial interaction to occur causing precipitates to be formed.

Table I illustrates the effectiveness of DADMAC polymer in the presence of a partially hydrolyzed polyacrylamide. The flow experiments were performed in unconsolidated argillaceous sand packs. The flood polymer was WC-500 polymer, a 33% hydrolyzed polyacrylamide commercially available from Calgon Corporation, which was dissolved in a 2% potassium chloride brine. This brine was chosen because the solution viscosity of the WC-500 polymer in 2% aqueous potassium chloride was much less than in fresh water. (A Brookfield viscosity of a 750 ppm solution at room temperature using the U.L. adaptor at 30 rpm was 3.6 cps.) The lower solution viscosity increased polymer solution injectivity and reduced the time required for each experiment. The use of the salt solution should not influence the compatibility of the WC-500 polymer with the DADMAC polymer. When a 750 ppm solution of the WC-500 polymer in 2% potassium chloride brine was mixed in a beaker with a 1% solution of either DADMAC polymer or poly(dimethylamine-co-epichlorohydrin) (hereinafter referred to as "DCE polymer") in 2% ammonium chloride solution, formation of a white precipitate immediately occurred. The WC-500 polymer concentration of 750 ppm was chosen as fairly typical of the polymer concentrations used in the U.S. Department of Energy sponsored Enhanced Oil Recovery Projects. More recently, the use of somewhat lower polymer concentrations averaging approximately 350 to 400 ppm have become more common.

As can be seen from the examination of the data obtained in Table I, the interaction of DADMAC polymer with WC-500 polymer caused column plugging despite the injection of 200 cc (19.6 pore volumes) of an inert spacer fluid designed to separate the two polymer solutions. Although this was not unexpected, the results obtained from the experiments reported in Table II were quite surprising.

The first 2 entries in Table II describe the results of control experiments in which no clay stabilizer was used. Instead, 9.8 pore volumes (100 cc) of 2% ammonium chloride was injected. In the first experiment, this was followed by sequential injection of 9.8 pore volumes of 2% potassium chloride solution followed by 9.8 pore volumes of 750 ppm WC-500 polymer solution in an aqueous 2% potassium chloride solution. The subsequent 2% potassium chloride solution flow rate was only 13.2% of the initial flow rate of the same brine. The low flow rate was probably due to incomplete elution of the WC-500 polymer although permeability damage to clay swelling and migration cannot be ruled out completely. Similar results were noted in entry 2 in which 117.6 pore volumes of the spacer was used. In both entries the test columns rapidly plugged after injection of fresh water (approximately 1 cc deionized water caused nearly complete shut-down of the column flow). Entries 3-8 of Table II relate to the effect of spacer volume on flow rates after injection of aqueous 750 ppm WC-500 polymer solution into a DCE polymer treated column. Two experiments were performed using 58.8 pore volumes of aqueous 2% potassium chloride as the spacer fluid. In the more permeable column (entry 3) the 2% potassium chloride brine flow rate, after flood polymer injection, was 53.0% of the initial 2% potassium chloride brine flow rate. In the less permeable sand pack used in the test summarized in entry 4, post-flood polymer injection of 2% potassium chloride brine indicated that, at the injection pressure of 50 psig, the column was plugged. This drastic reduction in flow rate was probably due to the viscosity of the WC-500 polymer solution and not reaction of the DCE polymer with the flood polymer, as suggested by the fresh flow rate data obtained in entry 3. The flow rate increase from 53.0% (using a 2% potassium chloride brine) to 78.1% suggested that the elution of WC-500 polymer solution was resulting in a flow rate increase.

Entries 5 and 6 reduced the spacer volume to 19.6 pore volumes. The results were erratic. While no evidence of column plugging was observed in the experiment summarized in entry 5, the post-flood polymer flow rates of 2% potassium chloride brine and fresh water were less than 20% of the original flow rate in entry 6. The flow rate did not increase with time (comparing the post-flood polymer fresh water and 2% potassium chloride brine flow rates). This suggested that the permeability reduction observed in experiment 6 was not merely due to the viscosity of the WC-500 polymer solution. These results suggested that 19.6 pore volumes of spacer fluid was at or just below the minimum spacer fluid volume required to prevent interaction of the cationic organic polymer with the anionic flood polymer.

Further reduction of the inert spacer volume to 4.9 pore volumes and 0.98 pore volumes (entries 7 and 8 respectively) resulted in greatly reduced column permeability indicating that precipitate formation from reaction of the cationic organic polymer clay stabilizer and the partially hydrolyzed polyacrylamide had occurred. The post-flood polymer 2% potassium chloride brine flow rate was greater than the initial flow rate and the flow rate was only reduced upon fresh water injection, indicating that a possible temporary flow channel opened up in the unconsolidated sand pack and that this channel was closed by shifting of the particles when flow was shut off during the change-over to fresh-water injection. Alternatively, precipitate formation in the test chamber could have at least partially closed off the flow channel.

In entries 3, 5, 6, and 8, the column was also treated with a petroleum sulfonate in a 2% potassium chloride solution which was injected onto the column followed by fresh water. The final fresh water flow rates indicated no evidence of reaction between the DCE polymer and the flood polymer to produce precipitate. The total volume of inert spacer fluid (78-83 pore volumes) included a 2% potassium chloride brine injected immediately after the clay stabilizer, the WC-500 polymer solution, and the subsequent 2% potassium chloride brine and fresh water injections.

In entry 9, DADMAC polymer was studied. A large volume of inert spacer fluid (117.6 pore volumes) produced a post-flood polymer 2% potassium chloride brine flow rate of only 21.3% of the initial flow rate. Subsequent injection of fresh water resulted in a small increase in flow rate. So, at least some of the flow rate reduction was possibly due to the viscosity of the WC-500 polymer solution. The fresh water flow rate increased slightly after the injection of a petroleum sulfonate solution suggesting continued slow elution of the flood polymer. Entries 10 and 11 illustrate that the post-petroleum sulfonate flow rates in the absence of WC-500 polymer solution were in excess of 90% of the initial rate, suggesting that the interaction of the DADMAC polymer with the partially hydrolyzed polyacrylamide was more severe than that between such clay stabilizer and the petroleum sulfonate. Entries 12 and 13 indicate consistent results when a different clay stabilizer (DCE polymer) is used.

Table III illustrates experiments that were performed in test columns containing both water-swelling and migrating clays. Instead of 5 weight percent smectite, the unconsolidated test sand contained 2.5% by weight kaolinite and 2.5% by weight smectite. Kaolinite is a migrating clay while smectite is a water-swelling clay. Entry 1 in Table III illustrates a 44.1 pore volume inert spacer fluid injected between the DCE polymer and the WC-500 polymer solution. The flow rate of a 2% potassium chloride solution injected after the WC-500 polymer was only 34.3% of the initial flow rate. The subsequent fresh water flow rate (23.6% of the initial 2% potassium chloride brine flow rate) suggested that the flow rate reduction was due to a physical plugging and not to the slow elution of the viscous flood polymer solution. This interpretation is supported by the results of entry 2. This test column did not contain any kaolinite and a somewhat larger volume (58.8 pore volumes) of inert spacer fluid was used. The 2% potassium chloride flow rate after flood polymer injection was only 53.0% of the initial flow rate. However, the subsequent fresh water flow rate increased to 78.1% of the initial 2% potassium chloride brine flow rate. This increase in flow rate suggested a slow elution of the viscous flood polymer solution and not a physical plugging phenomenon was responsible for this reduced flow rate. However, in the kaolinite-containing test column (entry 1) the fresh water flow rate was actually less than the preceding 2% potassium chloride brine flow rate, indicating that the low flow rates were not due to the slow elution of the flood polymer. Entries 3-5 of Table III study the effects of DADMAC polymer used in conjunction with subsequent injection of a micellar slug, a surfactant/oil/water emulsion, which would have a low interfacial tension with a crude oil. To simulate the anionic surfactant used in such micellar slugs, a petroleum sulfonate in 2% potassium chloride brine was used. The results indicate that in spite of a substantial decrease in the spacer fluid volume from 19.6 to 9.8 to 4.9 pore volumes, no physical plugging occurred. The flow rate of the 2% potassium chloride brine injected after the petroleum sulfonate was greater than the original 2% potassium chloride brine flow rate. The subsequent fresh water flow rate was greater than the original brine flow rate in all three experiments indicating that an effective clay stabilization treatment had been accomplished.

In none of the experiments summarized in Table III was any production of fine particles noted despite the presence of kaolinite, a migrating clay, in the test column. Thus, the increased post-treatment flow rates observed in the last three experiments summarized in Table III were due to effective clay stabilization and not to an increased column permeability caused by the elution of fine particles.

In the experiments summarized in Table IV, Berea cores containing approximately 12% clay by weight and Hassler-sleeve chambers were used. These tests were performed in two modes. In the first flow test procedure all treatment fluids were injected at the same end of the core to simulate clay stabilization treatment of an injection well. In the second test mode the flow direction was reversed as the clay stabilization treatment was injected in the opposite end of the Berea core from all other fluids. These tests were intended to model the clay stabilization treatment of production wells prior to polymer breakthrough in an enhanced oil recovery project. The cores were hydrated at ambient temperature (75° F.) using 2% potassium chloride brine. The pore volume of the core was determined by placing a known volume of brine in the fluid reservoir and injecting this brine into the dry core and producing 50 cc of fluid. The pore volume was the difference between the original brine volume and the sum of the produced fluid and the fluid remaining in the reservoir.

In entries 1 and 2 of Table IV, the DCE polymer treatment solution was injected in the reverse direction compared to the other fluids. The flow rate of 2% KCl brine injected after the flood polymer was greater than ninety percent of the initial 2% KCl flow rate in both cases. This indicated that physical plugging of the Berea core caused by reaction of the clay stabilizer and the partially hydrolyzed polyacrylamide had not occurred. While there were no major injectivity problems observed in entry 1, injectivity problems observed in the entry 2 flow test prompted acidization of the face of the core through which the inert spacer fluid was being injected. The subsequent increase in 2% KCl brine flow rate suggested that rust particles were gradually and continuously being deposited on the face of the bore. This hypothesis was supported by the observation that the subsequent fresh water flow rate was significantly less than the immediately prior 2% KCl brine flow rate in this experiment whereas in entry 1, the resultant flow rates were within experimental error. In entry 1 use of a 19.6 pore volume spacer between injection of the DCE polymer treatment solution from one end of the core and the flood polymer from the other resulted in excellent post-flood polymer flow rates. These flow rates were within experimental error of the initial 2% KCl brine flow rate. The inert spacer fluid injected into the opposite end of the column represented the production of formation water prior to flood polymer breakthrough. The much larger spacer volume (102.3 vs. 19.6 pore volumes) used in entry 2 suggested that the slightly decreased post-flood polymer flow rates were not due to the physical interaction of the cationic organic polymer and the partially hydrolyzed polyacrylamide.

The last two experiments summarized in Table IV were a study of DCE polymer treatment of an injection well followed by an inert spacer fluid and then by injection of a partially hydrolyzed polyacrylamide. Results were consistent with those obtained in unconsolidated clayey sands (see Table V). In experiment entry 3 use of less than twenty pore volumes of spacer (2% KCl brine) sufficed to given excellent flow rates after polymer injection. The post-flood polymer flow rate of the 2% KCl brine was substantially greater than the original flow rate indicating that no significant amount of physical plugging had occurred. The subsequent fresh water flow rate (greater than the original 2% KCl brine flow rate) confirmed the results and indicated that good clay stabilization was achieved.

In entry 4, similar results were obtained in a higher permeability (111.2 md vs. 71.6 md for the core used in entry 3) and higher clay content core using a 49.5 pore volume 2% KCl brine spacer. The somewhat lower post-flood polymer flow rates obtained in the 111.2 md Berea core as compared to the rates obtained in the 71.6 md core suggested that the permeability difference in the Berea cores used in entries 1 and 2 could not account for the lower post-flood polymer flow rates obtained in the more permeable column. The significantly higher total clay content (18-19%) core used in entry 4 compared to that used in entry 3 (10-11%) may account at least in part for the lower post-flood polymer flow rates obtained in the more permeable column. It was somewhat surprising to find that the more permeable column had a higher total clay content. All the clays detected in these two cores were migrating clays.

Thus, by using an inert spacer fluid containing no anionic chemicals between the cationic organic polymer and a partially hydrolyzed polyacrylamide or a petroleum sulfonate, successful clay stabilization without formation plugging due to reaction of the clay stabilizer and the flood polymer may be achieved. The inert spacer fluid appears to spread the cationic organic polymer out to form a monomolecular layer on the clays. The interaction between the clay and the tightly adsorbed cationic organic polymer is so strong that there is no interaction of the flood polymer and/or petroleum sulfonate with the clay stabilizer, that would otherwise lead to precipitate formation and permeability reduction.

This process may be used in injection wells prior to injection of anionic flood polymers and/or anionic surfactants. If flood chemical injection has already begun and formation permeability damage has occurred clay stabilization treatment in conjunction with acidizing injection wells should be performed. In this case, the clay stabilization treatment must be preceded by an inert spacer fluid to flush the anionic chemicals from the vicinity of the well bore. An inert spacer fluid must also be used prior to resuming injection of the anionic flood chemicals. Additionally, the clay stabilization treatment may be applied to production wells prior to polymer or surfactant breakthrough. In this case, the formation water being produced functions as a spacer fluid.

TABLE I

The Effectiveness of DADMAC Polymer[a] in the Presence of Partially Hydrolyzed Polyacrylamide[b]

| Entry 1 | | | Entry 2 | | |
| --- | --- | --- | --- | --- | --- |
| Treatment Step | Treatment Solution | Flow Rate cc/min (percent) | Treatment Step | Treatment Solution | Flow Rate cc/min (percent) |
| 1 | 500 cc 2% KCl Solution | 11.7 (100.0) | 1 | 500 cc 2% KCl | 11.3 (100.0) |
| 2 | 100 cc 2% NH4Cl Solution | | 2 | 100 cc 1% DADMAC Polymer in 2% NH4Cl Solution | |
| 3 | 200 cc 2% KCl Solution | 12.0 (100.6) | 3 | 200 cc 2% KCl Solution | 13.5 (119.5) |
| 4 | 100 cc 750 ppm WC-500 in 2% KCl Solution | | 4 | 100 cc 750 ppm WC-500 in 2% KCl Solution | |
| 5 | 100 cc 2% KCl Solution | 0.9 (7.7) | 5 | 100 cc 2% KCl Solution | 0.2 (1.8) |

[a] DADMAC polymer is poly(diallyldimethylammonium chloride).
[b] WC-500 polymer (a 33% hydrolyzed polyacrylamide which is commercially available from Calgon Corporation) was used. The Teflon ®-sleeved chamber was packed with (from bottom to top) 10 g of 70-170 U.S. mesh sand; 60 g of a mixture of 85% of 70-170 U.S. mesh sand, 10% of less than 325 U.S. mesh silica flour and 5% Wyoming bentonite; 10 g of 70-170 U.S. mesh sand; and 25 g 20-40 U.S. mesh sand. T = 145° F. Applied pressure was 50 psig. The column pore volume was 10.20 cc.

TABLE II

Clay Stabilization - Polymer Flood Tests in Sand Packs Containing Smectite[a]

| Entry | Initial 2% KCl Flow Rate (cc/min) | Clay Stabilizer | 2% KCl Flow Rate (% of Initial) | Spacer (Pore Volumes) | Flood Chemical[b] | Post-Flood Chemical Flow Rate (% of Initial) 2% KCl | Post-Flood Chemical Flow Rate (% of Initial) Fresh Water |
| --- | --- | --- | --- | --- | --- | --- | --- |
| 1 | 17.4 | —[c] | 109.2 | 117.6 | WC-500[d] | 20.4 | Plugged[e] |
| 2 | 8.2 | —[c] | 197.6 | 9.8 | WC-500 | 13.2 | Plugged |
| 3 | 7.9 | DCE Polymer[f] | 158.4 | 58.8 | WC-500 | 53.0 | 78.1 |
| | | | | 83.3 | RA-90[h] | — | 133.7 |
| 4 | 5.5 | DCE Polymer[f] | 145.5 | 58.8 | WC-500 | Plugged | — |
| 5 | 13.1 | DCE Polymer[f] | 181.8 | 19.6 | WC-500 | 128.3 | 170.0 |
| | | | | 78.4[g] | RA-90 | — | 115.6 |
| 6 | 14.6 | DCE Polymer[f] | 87.7 | 19.6 | WC-500 | 14.6 | 11.9 |
| | | | | 83.3[g] | RA-90 | — | 12.9 |
| 7 | 5.8 | DCE Polymer[f] | — | 4.9 | WC-500 | Plugged | — |
| 8 | 15.0 | DCE Polymer[f] | — | 0.98 | WC-500 | 132.9 | 17.9 |
| | | | | 83.3[g] | RA-90 | — | 19.3 |
| 9 | 9.2 | DADMAC Polymer[i] | 154.3 | 117.6 | WC-500 | 21.3 | 32.1 |
| | | | | 39.2[g] | RA-90 | — | 37.1 |
| 10 | 22.3 | DADMAC Polymer[i] | 71.9[j] | 44.1 | RA-90 | —[k] | 95.9 |
| 11 | 20.1 | DADMAC Polymer[i] | 89.5[j] | 19.6 | RA-90 | —[k] | 93.4 |
| 12 | 15.6 | DCE Polymer[f] | 104.5[j] | 19.6 | RA-90 | —[k] | 109.6 |
| | | | | 73.5[g] | WC-500 | —[k] | 3.5 |
| 13 | 16.9 | DCE Polymer[f] | 100.6[j] | 44.1 | RA-90 | —[k] | 98.2 |
| | | | | 53.9[g] | WC-500 | —[k] | 9.9 |

[a] 100 cc, 9.8 pore volume of one volume percent clay stabilizer in a 2% by weight ammonium chloride solution was used unless otherwise noted. The active polymer concentration in the DCE polymer solution was 0.45% by weight while that of the DADMAC polymer treatment solution was 0.33% by weight. See Footnote b, Table I for a description of the test columns.
[b] 100 cc, 9.8 pore volumes, of the flood chemical solution was used.
[c] 100 cc, 9.8 pore volumes, of 2% ammonium chloride solution was used in lieu of a cationic organic polymer in these control experiments.
[d] WC-500 is a 33% hydrolyzed polyacrylamide commercially available from Calgon Corporation. Flood polymer concentration was 750 ppm in 2% KCl brine, unless otherwise noted.
[e] This column plugged after injection of 1 cc fresh water.
[f] DCE Polymer is poly(dimethylamine-co-epichlorohydrin)
[g] This number is the total number of pore volumes of 2% KCl brine and fresh water injected subsequent to the injection of the first flood chemical.
[h] The POLYSTEP™ RA-90 petroleum sulfonate (commercially available from Stepan Chemical Company) concentration was one percent by weight in 2% KCl brine, unless otherwise noted.
[i] DADMAC polymer is poly(diallyldimethylammonium chloride).
[j] The clay stabilizer solvent was fresh water.
[k] Fresh water was injected directly after the flood chemical. No 2% KCl brine was injected subsequent to flood chemical injection.

TABLE III

Clay Stabilization-Polymer Flood Tests in Sand Packs Containing Both Swelling and Migrating Clays[a]

| Entry | Initial 2% KCl Flow Rate cc/min | Cationic Organic Polymer[a] | Post-Treatment 2% KCl Flow Rate (% of Initial) | Pore Volumes of Spacer (2% KCl) | Pore Volumes of Flood Chemical | Post-Flood Polymer Flow Rate (% of Initial) 2% KCl | Post-Flood Polymer Flow Rate (% of Initial) Fresh H2O |
| --- | --- | --- | --- | --- | --- | --- | --- |
| 1 | 8.9 | DCE Polymer[b] | 124.4 | 44.1 | 9.8 WC-500[c] | 34.3 | 23.6 |
| 2[d] | 7.9 | DCE Polymer[b] | 158.4 | 58.8 | 9.8 WC-500[c] | 53.0 | 78.1 |
| 3 | 5.0 | DADMAC Polymer[e] | 122.0 | 19.6 | 9.8 1% RA-90[f] | 121.0 | 120.2 |

TABLE III-continued

Clay Stabilization-Polymer Flood Tests in Sand Packs Containing Both Swelling and Migrating Clays[a]

| Entry | Initial 2% KCl Flow Rate cc/min | Cationic Organic Polymer[a] | Post-Treatment 2% KCl Flow Rate (% of Initial) | Pore Volumes of Spacer (2% KCl) | Flood Chemical | Post-Flood Polymer Flow Rate (% of Initial) 2% KCl | Fresh H$_2$O |
|---|---|---|---|---|---|---|---|
| 4 | 9.6 | DADMAC Polymer[e] | 122.1 | 9.8 | 9.8 1% RA-90[f] | 128.3 | 120.8 |
| 5 | 5.3 | DADMAC Polymer[e] | 115.6 | 4.9 | 9.8 1% RA-90[f] | 149.2 | 117.6 |

[a]The tests were performed at 145° F. using an applied pressure of 50 psig and a column packed with (from bottom to top 10 g 70-170 U.S. mesh sand; 60 g of a mixture of 85% 70-170 U.S. mesh sand, 10% of less than 325 U.S. mesh silica flour, 2.5% Wyoming bentonite, and 2.5% kaolinite; 10 g 70-170 U.S. mesh sand, and 25 g of 20-40 U.S. mesh sand. Column pore volume was 10.2 cc. and 9.8 pore volumes of cationic organic polymer solution was injected.
[b]The treatment solution contained 0.45 weight percent active polymer. DCE polymer is poly(dimethylamine-co-epichlorohydrin)
[c]WC-500 is a 33% hydrolyzed polyacrylamide commercially available from Calgon Corporation. The WC-500 polymer concentration was 750 ppm in 2% KCl solution.
[d]This column did not contain kaolinite. See footnote "a", Table I.
[e]The treatment solution contained 0.45 weight percent active polymer. DADMAC polymer is poly(diallyldimethylammonium chloride).
[f]POLYSTEP™ RA-90 petroleum sulfonate, commercially available from Stepan Chemical Company, is here dissolved in a 2% KCl brine.

TABLE IV

Clay Stabilization-Polymer Flood Tests in Berea Cores[a]

| Entry | Berea Core Pore Volume (cc) | Berea Core Permeability (md) | Initial 2% KCl Flow Rate cc/min | DCE Polymer Flow Direction[b] | Post-Treatment 2% KCl Flow Rate (% of Initial) | Pore Volumes of Spacer 2% KCl | Pore Volumes of Pusher ® 700[c] | Post-Flood Polymer Flow Rate (% of Initial) 2% KCl | Fresh H$_2$O |
|---|---|---|---|---|---|---|---|---|---|
| 1 | 16.2[g] | 104.0 | 20.98 | Reverse | 146.2 | 19.6 | 6.48[e] | 100.3 | 99.6 |
| 2 | 15.5[g] | 71.7 | 14.33 | Reverse | 202.7[d] | 102.3 | 10.3[e] | 92.5 | 86.4 |
| 3 | 13.5[h] | 71.6 | 15.93 | Same | 161.6 | 18.5 | 9.9[f] | 169.4 | 161.3 |
| 4 | 13.2[g] | 111.2 | 25.60 | Same | 142.6 | 49.5 | 10.1[f] | 121.8 | 113.4 |

[a]Flow tests were performed in Hassler sleeves at 145° F. using an applied pressure of 50 psig and an annulus pressure of 250 psig. Pore volumes of fluids varied slightly because the same absolute fluid volumes were used in most of the flow tests.
[b]Direction relative to 2% KCl brine and to flood polymer solution. The six pore volume DCE polymer solution contained 0.45% by weight of active polymer in 2% aqueous KCl. DCE polymer is poly(dimethylamine-co-epichlorohydrin).
[c]A 750 ppm solution of Pusher ®700, a 30% hydrolyzed polyacrylamide (commercially available from Dow Chemical Company), in 2% aqueous KCl was used.
[d]Flow rate after acidizing the face of the core.
[e]Solution viscosity (77° F.) of the flood polymer solution was 3.4 cps (Brookfield LVT, UL adapter, 30 rpm).
[f]Solution viscosity (77° F.) of the flood polymer solution was 3.6 cps (Brookfield LVT, UL Adapter, 30 rpm).
[g]Total clay content as determined by x-ray diffraction analysis was 18-21%.
[h]Total clay content as determined by x-ray diffraction analysis was 10-11%.

Now let us turn our attention to the use of cationic organic polymers to stabilize clays and formations subject to caustic flooding. In Table V, flow tests were performed at 200° F. using an applied pressure of 50 psig. The flow tests were conducted in Teflon®—sleeve chambers containing clayey sands having the same composition as those described in Table I and III. The sequence of fluid injection was:
1. standard laboratory brine (See Table 5, footnote b for definition of standard brine);
2. treatment solution (1 cc clay stabilizer +99 cc of 2% KCl solution.);
3. standard laboratory brine;
4. fresh water (deionized water was used);
5. deionized water adjusted to pH 12 using sodium hydroxide;
6. fresh water (deionized water was used).

In the first two entries of Table V, DCE polymer was used. The brine flow rate and the fresh water flow rate after treatment of the column were greater than 100%, indicating that the clay stabilization treatment had not damaged column permeability and that the smectite clay was stabilized to fresh water flow. Entries 3 and 4 used the DADMAC polymer. The post-treatment brine flow rates indicated that significant permeability damage had occurred during the clay stabilization treatment. The reason for this was not understood. Later results (see Table VI) suggested that the corrosive caustic solutions may have been forming rust particles in the fluid reservoir. These particles could have been carried into the Teflon®-sleeve chamber reducing column permeability and flow rate. The use of 2% ammonium chloride treatment solvent was probably not the cause since in entry 5 a post-treatment laboratory brine flow rate greater than the initial brine flow rate was observed. The injection of fresh water after the laboratory brine in entries 3 and 4 indicated that substantial clay stabilization was achieved.

Given the initial permeability damage obtained in entries 3 and 4, a further test (entry 5) was performed to give a more reliable basis for drawing preliminary conclusions. In this test, the post-treatment brine flow rate was 132.6% of the initial flow rate. The fresh water flow rate was 94.0% of the initial brine flow rate indicating that substantial clay stabilization was obtained. A total of 58.8 pore volumes of standard laboratory brine of fresh water were injected prior to injection of 49 pore volumes of pH 12 sodium hydroxide solution. After further injection of 34.3 pore volumes deionized water, the fresh water flow rate was 27.6% of the initial brine flow rate. Thus, the fresh water flow rate declined to 29.4% of its pre-pH 12 solution treatment value. The flow rate of the pH 12 solution treatment was 92.4% of the initial brine flow rate. Thus, the flow rate decline during injection of the pH 12 solution was minor. The reduction of flow rate occurred only upon fresh water injection. No production of solids was noted. This observation was similar to that noted in entry 2 using DCE polymer. Other than the clay stabilizer used and the greater column permeability in entry 5, the test conditions of entries 2 and 5 were virtually identical. Comparison of the final fresh water flow rates in entries 2 and 5 at approximately the same throughput volume (29.4 and 34.3 pore volumes, respectively) indicated that at the same inert spacer fluid volume, DCE polymer was less susceptible to base attack than DADMAC polymer.

Sodium silicate is being increasingly considered as an alternative to sodium hydroxide for use in caustic flooding. It has been reported that in core floods where in situ emulsification occurred, greater improvements in enhanced oil recovery were observed using sodium ortho-silicates than sodium hydroxide. (C. P. Brauer and D. T. Wasan "The Role of Emulsification in Entrainment Phenomena in Alkaline Water Flooding of Heavy Crude Oils", Paper No. INDE-111 presented August 23–28, 1981 at the 182nd American Chemical Society National Meeting, New York, New York) Table VI indicates the results of a series of flow experiments utilizing sodium silicate as the alkaline flood chemical. Using a total of 83.3 pore volumes of standard laboratory brine and fresh water as a spacer between injection of the DCE polymer treatment solution in the 4% sodium silicate solution, the subsequent fresh water flow rate was not reduced from its value prior to flood chemical injection.

The brine and fresh water flow rate prior to sodium silicate solution injection in entry 1 of Table VI were somewhat low. The post-DCE polymer treatment flow rates obtained in the next two tests illustrated by entries 2 and 3 were also quite low. Examination of the top of the sand used in entry 2 indicated that rust was present. The small rust particles were probably produced by the alkaline flood chemical used in previous experiments. After completion of entry 2, the fluid reservoir was cleaned out, but low flow rates and rust deposition were again observed in entry 3. The valves in flow lines were checked and found to contain mobile rust particles. The post-DCE polymer treatment fresh water flow rate in entry 4 indicated that cleaning the flow line solved this problem.

The results obtained in experiment 4 indicated that using only fresh water as the spacer (which is often preferable since many alkaline floods use a fresh water preflush to condition the reservoir) and reducing the spacer volume to approximately 40 pore volumes (relative to the treated rock) did not reduce the DCE polymer treatment effectiveness. The fresh water flow rates prior to and after 4% aqueous sodium silicate injection were within experimental error. The crude oil targeted for recovery and caustic flooding is often of relatively high viscosity under reservoir conditions. To assure effective displacement of the oil by the DCE polymer treatment, a compatible surfactant could be included in the treatment or a preflush of xylene or some other hydrocarbon could be used.

Another cationic organic polymer effective in these tests was poly(methacrylamido-4,8-diaza-4,4,8,8-tetramethyl-6-hydroxynonamethylene methochloride), abbreviated MDTHN polymer (see entry 5, Table VI). After introduction of the MDTHN polymer, 39 pore volumes of fresh water followed by the 4% sodium silicate solution was introduced. Subsequent fresh water flow rate was greater than the initial brine flow rate indicating that effective clay stabilization was achieved even after injection of the anionic chemical.

In certain circumstances it may be desirable to inject the aqueous cationic organic polymer clay stabilizer solution into the petroliferous formation as droplets dispersed in a water-external emulsion. Such circumstances are when the rock formation is so water sensitive that any contact with aqueous fluids prior to or during adsorption of the clay stabilizer onto the clays causes permeability damage and when there is a high saturation of viscous oil around the well bore. In the latter case, it is difficult for a low viscosity aqueous solution to displace the viscous oil to permit the clay stabilizer to contact the clays. However, use of an oil-external emulsion is more effective due to the absence of interfacial effects caused by water-crude oil contact.

The use of oil-external emulsions of aqueous droplets containing DCE polymer (hereinafter referred to as "Oil/DCE polymer") have been found to be effective in caustic flooding applications where there is relatively high viscosity oil. Entry 1 of Table VII illustrates the Oil/DCE polymer solution injected into a column containing both kerosine and brine. The post treatment kerosine and fresh water flow rates were 115.9% and 94.1% respectively. The inert spacer fluid was 39 pore volumes fresh water for a total of 83 pore volumes. The subsequent 1% aqueous sodium hydroxide flow rate was only approximately 42% of the initial brine flow rate. Subsequent fresh water flow rate was only 50.6% of the initial brine flow rate while kerosine flow rate was 116.7% of its initial rate.

The spacer fluid volume was then reduced to 34.3 pore volumes of kerosine in entry 2. No aqueous spacers were used. The flow rate of the 1% aqueous sodium hydroxide was 63.2% of the initial brine flow rate. Subsequent fresh water flow rate was only 46% of the initial brine flow rate. The final kerosine flow rate was within experimental error of the post-Oil/DCE polymer treatment kerosine flow rates.

These results indicated that the only circumstances in which Oil/DCE polymer treatment of a well should be considered are wells with high oil saturations in adjacent rock, i.e., new wells or production wells with high oil cuts. In other circumstances, it is preferred that aqueous DCE polymer treatment be used. DCE polymer treatment can optionally contain a non-ionic surfactant.

From Tables V, VI and VII it can be concluded that DCE polymer treatment was effective in the presence of sodium silicate as well as sodium hydroxide if an adequate volume of inert spacer fluid was injected after the clay stabilizer and prior to flood chemical injection. The DADMAC polymer appeared less effective in clay stabilization than DCE polymer in the presence of hydroxide ion. The use of Oil/DCE polymer in the presence of caustic flooding resulted in excellent retention of sand pack permeability of kerosine, but reduced fresh water flow rates were observed after injection of the Oil/DCE polymer and a 1% sodium hydroxide solution.

TABLE V

| | | FLOW RATE TEST RESULTS$^a$ FOR CAUSTIC FLOODING IN UNCONSOLIDATED CLAYEY SANDS | | | | |
|---|---|---|---|---|---|---|
| | | Initial Brine Flow Rate | Flow Rate After Treatment (% initial flow rate, treatment pore volume) | | | |
| Entry | Clay Stabilizer | (cc/min) | Std. Brine$^b$ | Fresh H$_2$O | pH 12 H$_2$O | Fresh H$_2$O |
| 1 | DCE Polymer | 7.9 | 100.6, 29.4 | 118.3, 29.4 | —, 9.8 | 116.8, 34.3 |

TABLE V-continued
FLOW RATE TEST RESULTS[a] FOR CAUSTIC FLOODING IN UNCONSOLIDATED CLAYEY SANDS

| Entry | Clay Stabilizer | Initial Brine Flow Rate (cc/min) | Flow Rate After Treatment (% initial flow rate, treatment pore volume) | | | |
|---|---|---|---|---|---|---|
| | | | Std. Brine[b] | Fresh H$_2$O | pH 12 H$_2$O | Fresh H$_2$O |
| 2 | DCE Polymer | 9.4 | 101.0, 29.4 | 110.9, 29.4 | 94.2, 49.0 | 118.8, 88.2 |
| 3 | DADMMAC Polymer, lot 1 | 5.5 | 38.7, 58.8 | 29.1, 34.3 | —, 9.8 | 27.1, 34.3 |
| 4 | DADMAC Polymer, lot 2 | 14.2 | 32.8, 58.8 | 40.2, 58.8 | 24.7, 49.0 | 25.7, 171.6 |
| 5 | DADMAC Polymer, lot 2 | 15.4 | 132.6, 29.4 | 94.0, 29.4 | 92.4, 49.0 | 27.6, 34.3 |

[a]Test Temperature was 200° F. (93.3° C.). All clay stabilization chemicals are present in two weight percent potassium chloride solution. See footnote a, Table II for concentrations of the cationic organic polymers and the test columns used in these tests.
[b]The standard brine is a synthetic brine of the following composition: 240:18.1:1.34:1 parts by weight respectively of fresh water, NaCl, CaCl$_2$, and MgCl$_2$.H$_2$O. The composition represents average constituent ratios based on those associated with hundreds of oil field formation brines previously analyzed in the laboratory.

TABLE VI
Results for Sodium Silicate Floods of Cationic Organic Polymer Treated Sand Packs.[a]

| Entry | Initial Brine Flow Rate cc/min | Post-Treatment Flow Rates (% of initial) | | Pore Volumes Brine and Fresh Water | Post-Sodium Silicate Fresh Water Flow Rate (% of Initial Brine) |
|---|---|---|---|---|---|
| | | Brine | Fresh Water | | |
| 1 | 16.1 | 78.9 | 84.1 | 83.3 | 87.4 |
| 2 | 16.1 | — | 59.4 | 39.2 | 59.7 |
| 3 | 15.5 | — | 67.9 | 39.2 | 66.2 |
| 4 | 15.9 | — | 110.1 | 39.2 | 111.9 |
| 5[b] | 15.5 | — | 112.3 | 39.2 | 122.9 |

[a]T = 200° F. Applied pressure was 50 psig. The Teflon ®-sleeve chamber was packed in the same manner as described in footnote b of Table I. The clay stabilization treatment was 100 cc of 0.45 weight percent DCE polymer unless otherwise noted, and two weight percent ammonium chloride. The alkaline fluid injected was 100 cc (9.8 pore volumes) of 4% by weight sodium metasilicate in fresh water.
[b]The 100 cc treatment solution contained 0.45 weight percent poly(methacrylamido-4,8-diaza-4,4,8,8-tetramethyl-6-hydroxynonamethylene methochloride) and 2 weight percent ammonium chloride.

TABLE VII
Results of Sodium hydroxide Floods of Oil/DCE Polymer Treated Sand Packs[a]

| Entry | Initial Brine Flow Rate (cc/min) | Kerosine Flow Rate (cc/min) | Post-Treatment Kerosine (% Initial Kerosine) | Flow Rate Fresh Water (% Initial Brine) | Pore Volume % Fresh Water | Flow Rates (% Initial Brine) | | Kerosine (% Initial Kerosine) |
|---|---|---|---|---|---|---|---|---|
| | | | | | | NaOH | Fresh Water | |
| 1 | 12.9 | 29.3 | 115.9 | 94.1 | 44.1 | 41.8 | 50.6 | 116.7 |
| 2 | 17.5 | 31.1 | 126.3 | — | — | 63.2 | 46.0 | 127.6 |

[a]See footnote "b", Table I for test column and conditions. The clay stabilization treatment was 200 cc of Oil/DCE polymer, 0.58% poly(dimethylamine-co-epichlorohydrin) dissolved in 2.5 cc water and dispersed in 197.5 cc kerosine. The alkaline fluid injected was 350 cc (34.3 pore volumes) 1% by weight sodium hydroxide solution in fresh water.

It should be recognized that the amount of inert spacer fluid sufficient to cause the clay stabilization polymer to reorient itself on the clay in such a manner as to cause the polymer to continue to stabilize the clay when said clay is subjected to anionic or caustic flood chemicals, will vary according to formation composition. Areas of concern are formation permeability and heterogeneity of the permeability of the formation rock, the porosity of the formation rock, mineralogy of the formation, type and concentration of the cationic organic polymer clay stabilizer utilized, identity and concentration of the anionic or caustic flood chemical, and the formation temperature. There is no general formula that will illustrate the minimum effective amount of inert spacer fluid volume required for clay stabilization success. The minimum effective amount of inert spacer to be utilized can presently be determined only through laboratory analysis.

Although particular embodiments of the invention have been described, it will be understood that the invention is not limited thereto, since modifications may be made and will become apparent to those skilled in the art. For example, the spacer fluid injected after the cationic organic polymer clay stabilizer should not contain calcium or magnesium salts. Contact of these salts with sodium hydroxide or sodium carbonate solutions will form calcium hydroxide and calcium carbonate each having a low solubility. Contact of these salts with a partially hydrolyzed polyacrylamide will result in formation of a polymer salt which is of low solubility and is a poor viscosifier. Another example is illustrated where an anionic flood chemical has already been injected. In such case a preflush injection ahead of the cationic organic polymer solution will be required. This will prevent contact of the clay stabilizer with the anionic flood chemical prior to adsorption of the clay stabilizer on the clays.

We claim:

1. In an oil reservoir subject to enhanced oil recovery treatment, said treatment including the introduction of anionic or caustic flood chemicals into said reservoir, a method of stabilizing clays comprising the steps of:
    mixing a clay stabilizing cationic organic polymer with a carrier fluid;
    introducing the clay stabilizing cationic organic polymer containing carrier fluid into the reservoir treatment area,
    introducing an effective amount of non-ionic aqueous fluid, said fluid being essentially inert with respect to said clay stabilizer and containing less than about 5% monovalent salts by weight, into said reservoir treatment area to cause said polymer to reorient itself on the clay in such a manner that said polymer continues to stabilize said clay, but does not substantially interact with the anionic or caustic flood chemicals, and introducing into said reservoir treatment area said anionic or caustic flood chemicals.

2. The method of stabilizing clays in accordance with claim 1, wherein at least one of said clay stabilizing cationic organic polymer repeating units comprises a cationic atom in the polymer chain.

3. The method of claim 2, wherein at least one of the repeating units comprises:

$$\left[ -\underset{\underset{CH_3}{|}}{\overset{\overset{CH_3}{|}}{N^+}}-(CH_2)_6\overset{\overset{2Br^-}{}}{\underset{\underset{CH_3}{|}}{\overset{\overset{CH_3}{|}}{N^+}}}-(CH_2)_3- \right]_n$$

4. The method of claim 2 wherein the polymer is poly(1,5-dimethyl-1,5-diaza-undecamethylene methobromide).

5. The method of stabilizing clays in accordance with claim 1, wherein at least one of said clay stabilizing cationic organic polymer repeating units comprises a cationic atom in the polymer chain with heteroatoms such as oxygen present.

6. The method of claim 5, wherein at least one of the repeating units comprises:

$$\left( -\underset{\underset{CH_3}{|}}{\overset{\overset{CH_3}{|}}{N^+}}-CH_2-\overset{\overset{OH}{|}}{CH}-CH_2- \right)_n$$

7. The method of claim 5 wherein the polymer is poly(dimethylamine-co-epichlorohydrin).

8. The method of stabilizing clays in accordance with claim 1, wherein a major portion of said clay stabilizing cationic organic polymer units are defined as comprising polymers having a cationic atom in a ring.

9. The method of claim 8, wherein at least one of the repeating units comprises:

$$\left[ \begin{array}{c} -CH_2 \quad\quad CH_2- \\ \diagdown\!\! CH-CH \!\!\diagup \\ CH_2 \quad\quad CH_2 \\ \diagdown\!\! \underset{CH_3\ \ CH_3}{\overset{+}{N}} \!\!\diagup \ Cl^- \end{array} \right]_n$$

10. The method of claim 8, wherein at least one of the repeating units comprises:

$$\left( \begin{array}{c} -CH_2 \quad\quad CH_2 \\ \diagdown\!\! CH \quad\quad CH \!\!- \\ |\quad\quad\quad | \\ CH_2 \quad\quad CH_2 \\ \diagdown\!\! \underset{CH_3\ \ CH_3}{\overset{+}{N}} \!\!\diagup \ Cl^- \end{array} \right)$$

or mixtures thereof.

11. The method of claim 8 wherein the polymer is poly(diallyldimethylammonium chloride).

12. The method of stabilizing clays in accordance with claim 1, wherein a major portion of said clay stabilizing cationic organic polymer units are defined as comprising polymers having a cationic atom in a polymer side chain.

13. The method of claim 12, wherein at least one of the repeating units comprises:

$$\left[ -CH_2-\underset{\underset{\underset{NHCH_2CH_2CH_2\overset{+}{\underset{|}{N}}-CH_2CHCH_2\overset{+}{N}(CH_3)_3}{CH_3}}{\overset{|}{C}\ O}}{\overset{\overset{CH_3}{|}}{C}}\overset{Cl^-\quad CH_3\quad OH\quad Cl^-}{} \right]_n$$

14. The method of claim 12 wherein the polymer is poly(methacrylamido-4,8-diaza-4,4,8,8-tetramethyl-6-hydroxynonamethylene methochloride).

15. A method of claim 1 wherein the carrier fluid is a saline solution comprised of water and a salt selected from the group consisting of sodium chloride, potassium chloride, ammonium chloride or mixtures thereof.

16. A method of claim 1 wherein the carrier fluid is a saline solution comprised of water and at least 2% potassium chloride by weight.

17. A method of claim 1 wherein the carrier fluid is a saline solution comprised of water and at least 2% ammonium chloride by weight.

18. A method of claim 1 wherein the carrier fluid is a saline solution comprised of water and at least 5% sodium chloride by weight.

19. A method of claim 1 wherein the non-anionic aqueous fluid is water.

20. A method of claim 1 wherein the non-anionic aqueous fluid is comprised of water and a monovalent salt selected from the group consisting of ammonium chloride, potassium chloride, sodium chloride, or mixtures thereof.

21. The method of claim 20 wherein the monovalent salts are present in an aggregate amount of less than 5% by weight.

22. In an oil reservoir subject to enhanced oil recovery treatment, said treatment including the introduction of anionic or caustic flood chemicals into said reservoir, a method of stabilizing clays comprising the steps of:

mixing a clay stabilizing cationic organic polymer in a saline carrier solution containing less than 5% monovalent salts by weight, introducing the clay stabilizing cationic organic polymer containing carrier fluid into the reservoir treatment area, introducing an effective amount of non-anionic aqueous fluid containing less than about 5% monovalent salts by weight into said reservoir treatment area to cause said polymer to reorient itself on the clay in such a manner that said polymer continues to stabilize said clay, but does not substantially interact with the anionic or caustic floor chemicals, and, introducing into said reservoir treatment area said anionic or caustic flood chemicals.

23. The method of claim 22, wherein the clay stabilizing cationic organic polymer is poly(1,5-dimethyl-1,5-diaza-undecamethylene methobromine).

24. The method of claim 22, wherein the clay stabilizing cationic organic polymer is poly(dimethylene-co-epichlorohydrin).

25. The method of claim 22, wherein the clay stabilizing cationic organic polymer is poly(diallyldimethylammonium chloride).

26. The method of claim 22, wherein the clay stabilizing cationic organic polymer is poly(methacrylamido-4,8-diaza-4,4,8,8-tetramethyl-6-hydroxynonamethylene methochloride).

* * * * *